United States Patent [19] [11] 3,917,235
Deve [45] Nov. 4, 1975

[54] MIXING APPARATUS
[75] Inventor: Vagn Deve, East Washington, Pa.
[73] Assignee: Combustion Engineering, Inc., Windsor, Conn.
[22] Filed: Apr. 26, 1974
[21] Appl. No.: 464,585

[52] U.S. Cl. ............................................. 259/9
[51] Int. Cl.² ........................ B01F 7/04; B01F 7/10
[58] Field of Search ..................... 259/9, 10, 45, 46

[56] References Cited
UNITED STATES PATENTS

| | | | |
|---|---|---|---|
| 1,563,101 | 11/1925 | Offenhauser | 259/46 |
| 2,679,385 | 5/1954 | Lodige | 259/9 |
| 3,346,239 | 10/1967 | Larson | 259/9 |
| 3,643,928 | 2/1972 | Stollman | 259/6 |

Primary Examiner—Harvey C. Hornsby
Assistant Examiner—Alan Cantor
Attorney, Agent, or Firm—Robert L. Olson

[57] ABSTRACT

Mixing apparatus for intimately mixing two or more different materials including a horizontally positioned cylindrical housing, a rotatable axial shaft extending throughout the length of the housing, the shaft having a plurality of blades attached thereto, which blades are at an angle of inclination such as to impart helical motion to the mixing materials, thus moving them from an inlet end of the housing to the outlet end. Some of the blades are shorter than others, so that an intermittent, shearing, mixing action of the materials takes place as they traverse the length of the housing.

3 Claims, 3 Drawing Figures

MIXING APPARATUS

BACKGROUND OF THE INVENTION

One method of producing foundry molds and cores is to utilize a quick-setting sand, resin, catalyst mixture. The materials are kept separated until a mold is to be made, at which time the three materials must be mixed, with the mixture then immediately being fed to a molding machine. In order to obtain molds of the desired strength, the sand, resin and catalyst generally must be rapidly and intimately or thoroughly mixed, due to the quick-setting nature of the mixture.

SUMMARY OF THE INVENTION

The mixing apparatus of the invention utilizes a horizontal cylindrical housing having a rotatable axial shaft therein. Secured to and rotatable with the shaft are a plurality of blades or paddles secured thereto, which blades are at an angle of inclination so as to impart helical motion to the materials to be mixed. At each longitudinal location, there are two diametrically opposed blades, one of which is of such radial length to be in close juxtaposition with the inner cylinder wall, while the other is somewhat shorter. Imperforate circular baffles are positioned downstream of the inlets to the housing, to cause the materials being introduced to immediately be picked up by the blades so as to enter the helical orbit flow pattern.

DESCRIPTION OF THE PREFERRED EMBODIMENT

Figure 1:
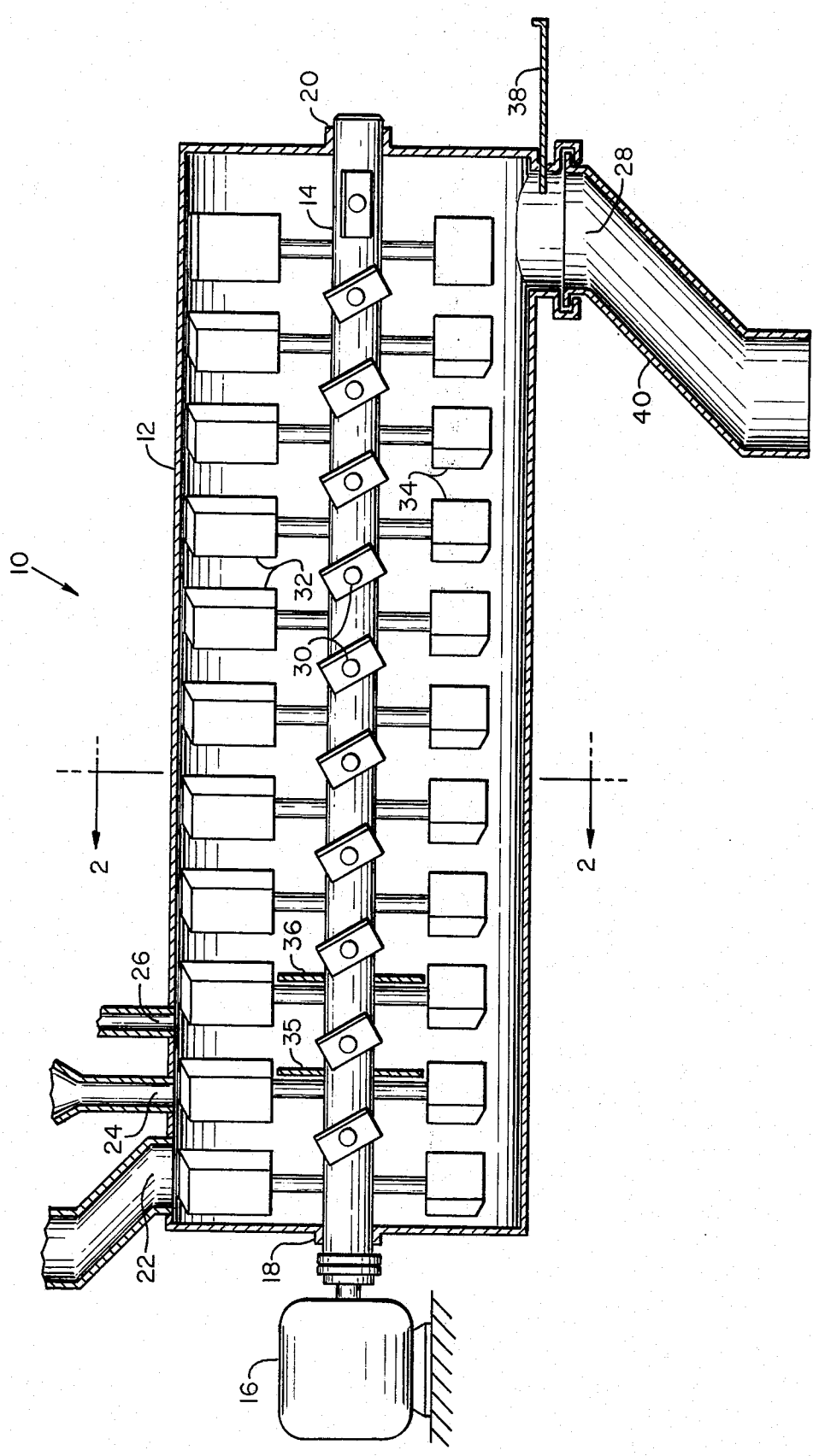
FIG. 1 is a cross-sectional side view of a mixer constructed in accordance with the invention.

Looking now to FIG. 1, numeral 10 designates the mixing apparatus in its entirety. The apparatus consists of a stationary, horizontal cylindrical housing 12, containing a high speed (1,000 rpm) rotatable shaft 14, driven by motor 16. The ends of shaft 14 are mounted in bearings 18 and 20.

Figure 2:
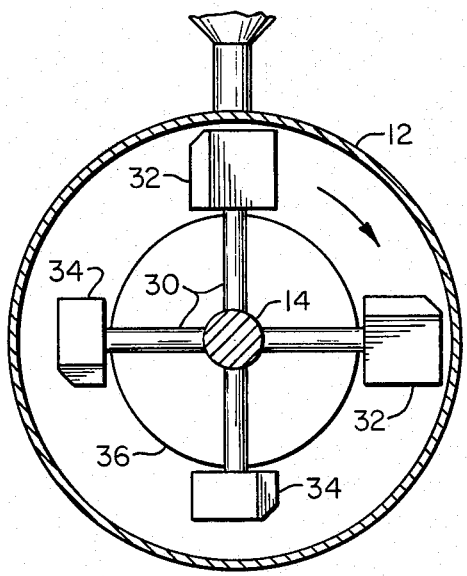
FIG. 2 is a view taken on lines 2—2 of FIG. 1.

Sand is introduced to the housing 12 through inlet 22, resin through inlet 24, and catalyst through inlet 26. These materials, after traversing the length of cylindrical housing 12 in a helical flow pattern, are discharged through outlet 28. A plurality of rods 30 are securely attached, for example by welding, to the rotatable shaft 14. Secured to the ends of these rods are blades or paddles 32 and 34. As shown in FIGS. 1 and 2, at each longitudinal location there is one long blade 32, and diametrically opposite thereof is a short blade 34, the purpose of which will be explained later in the description of the operation of the mixer. Located just downstream of the inlets 24 and 26 are a pair of imperforate circular baffles 35 and 36, respectively. These baffle plates are secured to the shaft 14 so as to be rotatable therewith, and extend in a radial direction to a point close to the inner extremity of the blades 32 and 34. The purpose of the baffles is to cause all of the sand, resin and catalyst to immediately flow into the path of the rotating blades, so as to be put into a helical flow pattern along the inner wall of housing 12. Because of the high speed of rotation of blades 32 and 34, an air turbine effect exists in the cylindrical housing 12, and without the baffles sand dust, and resin and catalyst mist could traverse the length of the housing along its center portion. This could create an undue amount of undesirable dust exiting from the outlet 28, and also diminish the thorough mixing of the materials. Since the amount of sand in the final mixture is large (95 percent or more) it is imperative that all of the resin and catalyst come into intimate contact with every sand particle passing through the mixer.

As a further means of enhancing the above, outlet 28 is provided with a slide gate valve 38, which can be adjusted to vary the size of the outlet opening. The gate 38 is set during a mixing operation to provide a slight backup of the material being discharged. This slight backup of material will not cause the entire mixer to fill up, because as the film of material backing up increases, the pressure drop across the outlet increases, causing more of the material to be discharged. Thus the slight backup of material is self-regulating, i.e. as the amount of backup material gets larger, more is discharged. This backup of material near the discharge outlet not only forms a seal, reducing the amount of dust discharged, but it also causes a final tumbling, mixing action to the mixed material just prior to its discharge from the machine.

Secured to the housing 12 and surrounding outlet 28 is a dogleg duct 40, which is rotatable with respect to the housing 12. Many mold flasks or boxes are quite large today, and by rotating the duct 38 while the resinous sand mixture is being discharged, an operator can more evenly distribute the discharging material into a mold flask positioned beneath the discharge duct 40.

The blades 34 and 36 are secured to rods 30 at an angle of inclination to a plane transverse of the axis of the housing such that the materials being mixed are pushed forward a given amount by each blade from the inlet end of the housing towards the outlet end. The angle of inclination used depends on the type of materials being mixed, and the number, size and speed of rotation of the blades. For mixing sand, resin and catalyst in a housing roughly 5 feet long containing approximately 60 blades, each 2 to 3 inches wide, with a speed of rotation of 1,000 rpm, a very thorough mix resulted with an angle of inclination of 30°. The residence time of the material traversing the housing from the inlet end to the outlet end is 2 to 5 seconds, and 6 to 8 hundred pounds of sand, resin and catalyst can be mixed per minute. The size and number of blades used should be such that there are no "blind" spots throughout the length of the housing; i.e. areas where the material being mixed will not be contacted by one or another of the angled blades during one complete revolution.

Figure 3:
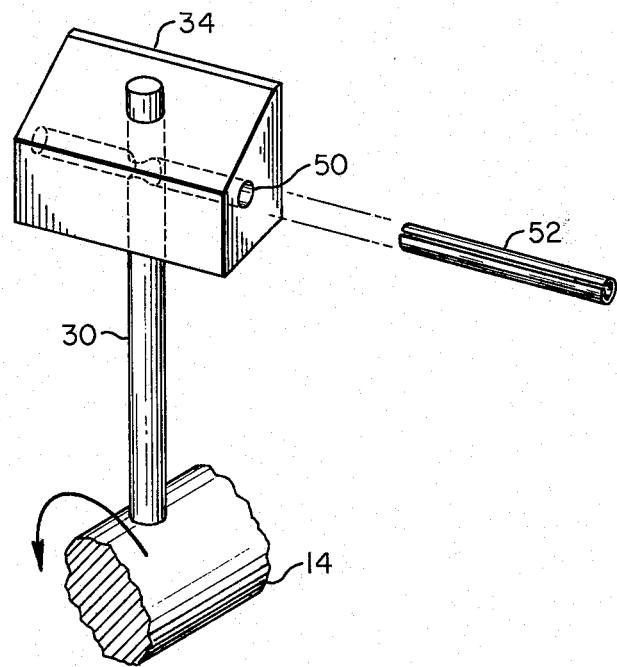
FIG. 3 is an enlarged exploded view of one of the paddles of the mixer.

Since the greatest wear of any part of the mixing apparatus will occur on the face of the blades which comes into contact with the abrasive sand during its travel through the housing, the blades 32 and 34 are removably attached to the rods 30. As shown in FIG. 3, the blade 34 is fastened to the rod 30 by a flexible spring pin 52 which is hammered into place in hole 50. The opening 50 cuts through the rod 30, so the spring pin 52, when pounded into place, locks the blade onto the rod at its proper angle of inclination. When one or more of the blades become worn, the housing 12 is opened, (which can be accomplished by making the housing of two semicylindrical members hinged together) and the spring pins 52 are tapped out of the openings 50, allowing removal and replacement of the blades.

The operation of the mixer will now be described. Sand, resin and catalyst are introduced to the inlet end of the cylindrical housing 12. Baffles 35 and 36 cause the materials to immediately flow radially outwardly so as to be contacted by the blades 32 and 34, where a helical motion is imparted to the materials. During rotation of the blades, a short blade 34 first comes into contact with some of the mixing materials at a given longitudinal location, shearing off this layer of mixing materials, and moving this portion helically forward. Upon a further 180° rotation of the shaft 14, the diametrically opposed longer blade 32 contacts the mixing materials closest to the inner wall of the housing, which was not contacted by the short blade 32, moving this material forward. Thus, layers of mixing material are alternately and intermittently moved forward by the short and long blades. This constant shearing action of the layers of mixing materials greatly aids the mixing action, causing thorough and intimate contact of all of the materials. The gate valve 38 is positioned so as to allow a slight backup of material near the discharge end, minimizing the dust discharged from the mixer, and also giving the material a final tumbling, mixing action before being discharged. While the mixer was designed specifically for mixing sand, resin and catalyst, it has application for mixing any two materials where a thorough, intimate, resultant mix is required.

What is claimed is:

1. Mixing apparatus including a cylindrical housing having a horizontal axis, an axial, longitudinal shaft extending from one end of the housing to the other end, means for rotating the shaft, inlet means for introducing materials to be mixed into the housing at one end, outlet means through which mixed material can be discharged from the other end of the housing, a plurality of paddle means extending radially from the shaft, each paddle means consisting of a radial rod secured at its inner end to the shaft, and having a blade secured to its outer end, all of said blades being secured to the rods at an angle of inclination to a plane transverse to the axis of the cylinder such that they move the materials to be mixed together from the inlet end to the outlet end of the housing, the blades being positioned such that there is a pair of diametrically opposed blades at each longitudinal location, one of each pair of diametrically opposed blades at each longitudinal location extending in a radial direction so that its outer extremity is in close proximity to the inner wall of the cylindrical housing, while the other of each pair of the diametrically opposed blades at each longitudinal location has an outer extremity somewhat spaced from the inner wall of the cylindrical housing, so that the materials are constantly and intermittently exposed to shearing, intermixing forces as they helically travel the length of the housing, and imperforate circular baffle means secured to the shaft and extending radially to a point closely adjacent the inner extremities of the blades, said baffle means being located longitudinally at a point downstream of and adjacent to the inlet means.

2. The mixing apparatus set forth in claim 1, wherein the outlet means includes an opening in the bottom of the cylindrical housing, duct means secured to the housing surrounding the opening and extending downwardly therefrom, with the lower outlet end of the duct means being movable with respect to the cylindrical housing.

3. The mixing apparatus set forth in claim 1, wherein the outlet means includes an adjustable damper, which can be set such that a slight backup of material being discharged is created.

* * * * *